United States Patent [19]

Allemano

[11] Patent Number: 4,491,015
[45] Date of Patent: Jan. 1, 1985

[54] COMBINED INSTRUMENT SYSTEM FOR DIVERS

[76] Inventor: Emilio Allemano, Via Rosolino Pilo 4, 10143 Torino, Italy

[21] Appl. No.: 474,101

[22] Filed: Mar. 10, 1983

[30] Foreign Application Priority Data

Jul. 27, 1982 [IT] Italy .................. 53552/82[U]

[51] Int. Cl.³ .................. G01F 23/14; G01L 19/14
[52] U.S. Cl. .................. 73/300; 73/431; 73/756
[58] Field of Search .................. 73/300, 756, 432 A, 73/431; 368/282, 281

[56] References Cited

U.S. PATENT DOCUMENTS 3,828,611  8/1974  Shamlian .................. 73/300
3,888,127  6/1975  Shamlian .................. 73/300

Primary Examiner—Donald O. Woodiel
Attorney, Agent, or Firm—David A. Jackson; Daniel H. Bobis

[57] ABSTRACT

A combined instrument system for divers, in which a first instrument is connectable to a user by flexible attachment means and is snap engaged to a link which can be connected removably to at least one further instrument disposed alongside the first instrument and fixed in position on the said link by removable closure means.

8 Claims, 6 Drawing Figures

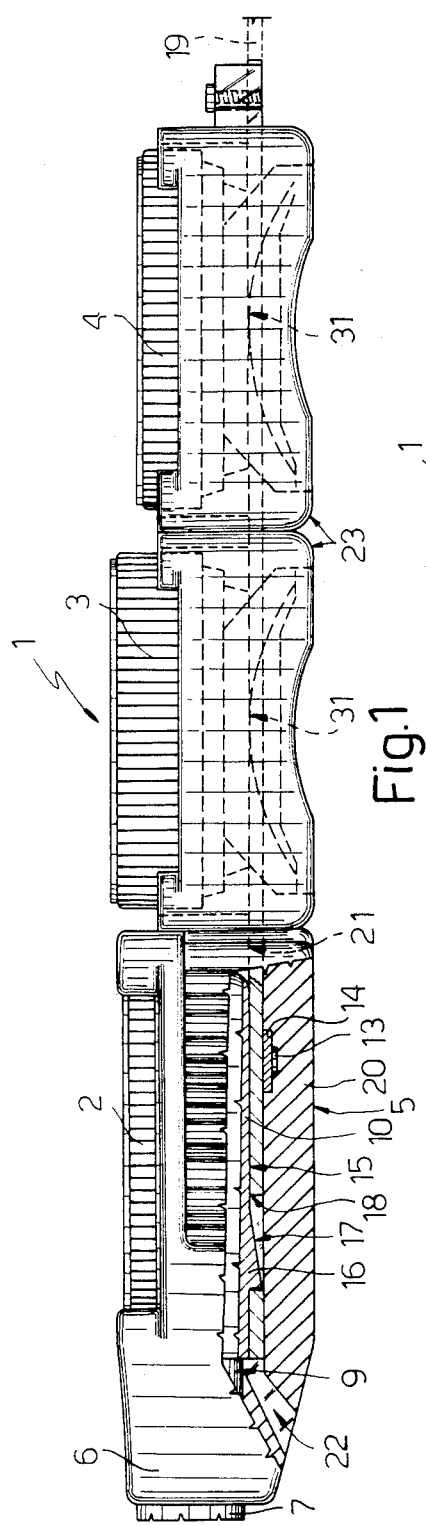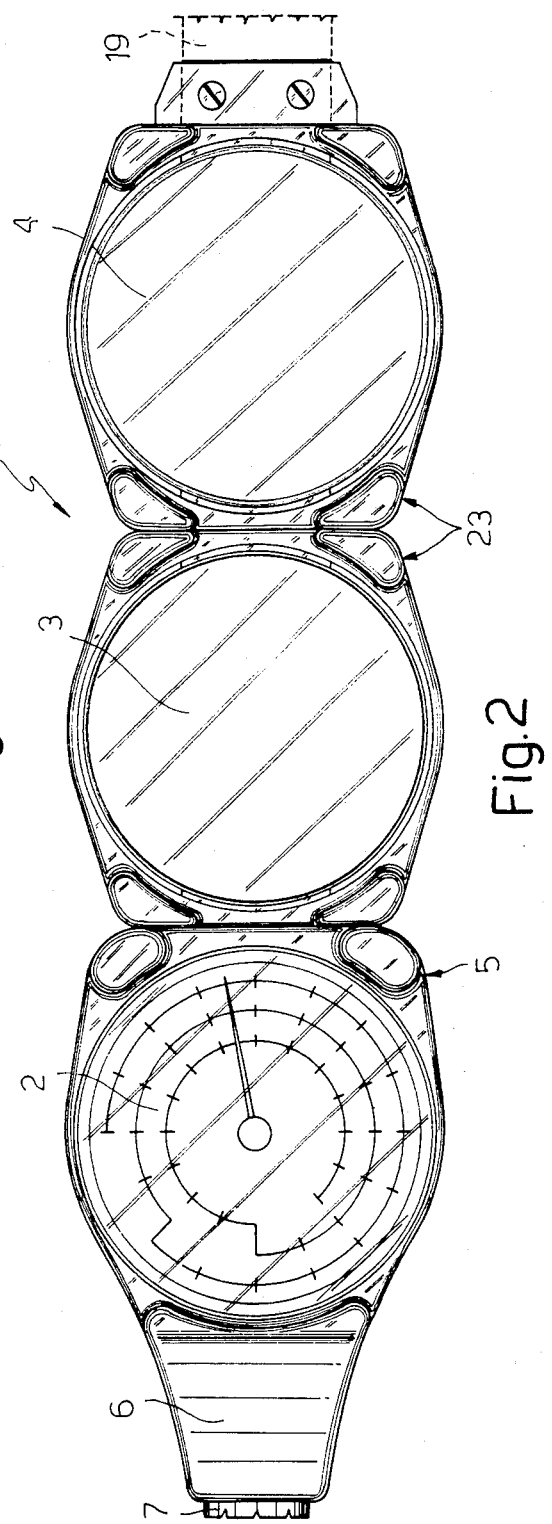

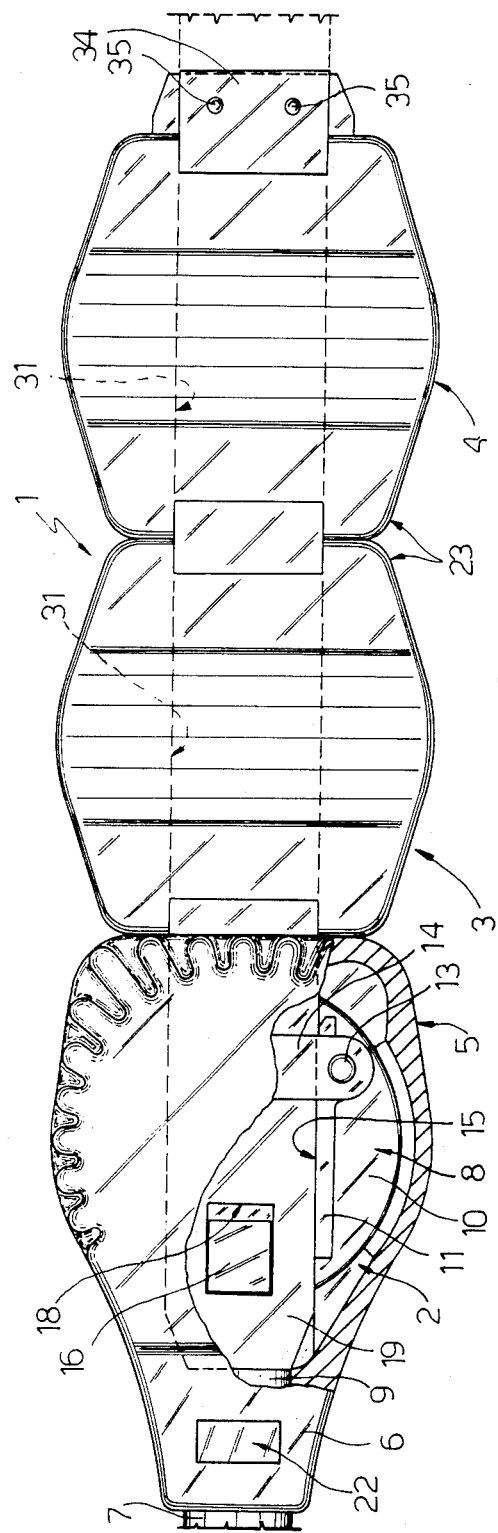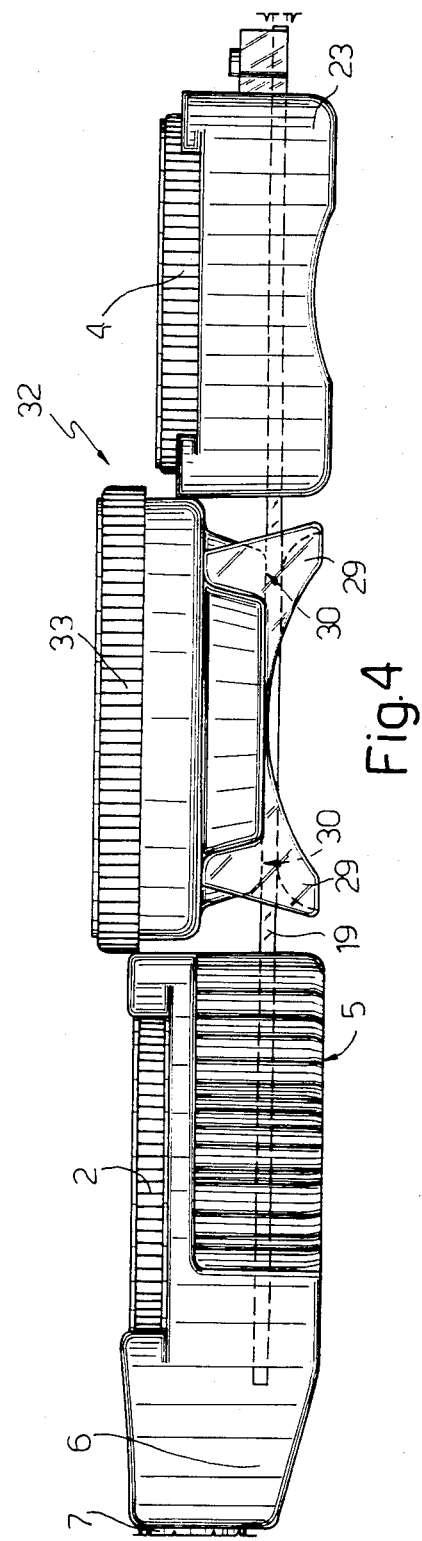

4,491,015

COMBINED INSTRUMENT SYSTEM FOR DIVERS

BACKGROUND OF THE INVENTION

The present invention relates to combined instrument system for divers.

In order correctly to perform underwater dives with the aid of breathing equipment, use is normally made of a plurality of instruments, usually comprising a manometer or pressure gauge connected to the air bottles of the breathing equipment, a depth meter and a chronometer often flanked by a decompression meter and a compass.

With the exception of the pressure gauge which is always connected to the air bottles, the other instruments can be carried by the user either on an arm or connected to one another on a single support connected to the air bottles and normally identified on the market by the term "console".

In general, consoles commercially available today include a relatively flat elongate support body on a major face of which there are formed seats each for housing an associated instrument in a fixed manner. The said seats are normally disposed in a single row and the first of these houses the said pressure gauge manometer. This latter is connected, by means of a connector extending out from one end of the said support body, to a length of flexible tubing connectable to the air bottles of the breathing equipment and serving not only as a duct for the compressed air, but also as a mechanical connection cable between the console and the breathing apparatus.

A console such as that described above has several disadvantages, such as, for example, the relatively high price and a significant difficulty in maintenance due to the limited flexibility of construction and use of the console itself. In fact, such a console does not permit easy removal of its component instruments and normally includes instruments some of which are already possessed by the user, who is constrained to face, at one go, the cost of acquiring many instruments without, in fact, necessarily obtaining the desired combination of instruments.

SUMMARY OF THE INVENTION

The object of the present invention is that of providing an instrument system for divers, which will be able to replace consoles currently in use and in which the above described disadvantages will be eliminated.

The said object is achieved by the present invention in that it relates to a combined instrument system for a diver comprising an elongate support connectable at one end to a user by flexible attachment means, and a first and at least a second instrument connected to the said support, characterised by the fact that the said support includes a link slidably engaged through a respective seat formed on each said instrument, the said instruments being mounted in a line along the said link; the first of the said seats having connection means to the said link for locking this latter in a removable manner into the said first seat; and locking means being provided for rendering the said link rigidly connected to each said second instrument.

BRIEF DESCRIPTION OF THE DRAWINGS

Further characteristics and advantages of the present invention will become apparent from the following description with reference to the attached drawings, which illustrate several non-limitative embodiments thereof, in which:

FIG. 1 is a side view with parts in section, of a combined instrument system or console formed according to the principles of the present invention;

FIG. 2 is a plan view of the console of FIG. 1;

FIG. 3 is a rear view of the console of FIG. 1;

FIG. 4 is a side view of a variant of the console of FIG. 1;

DETAILED DESCRIPTION OF THE INVENTION

Figure 6:
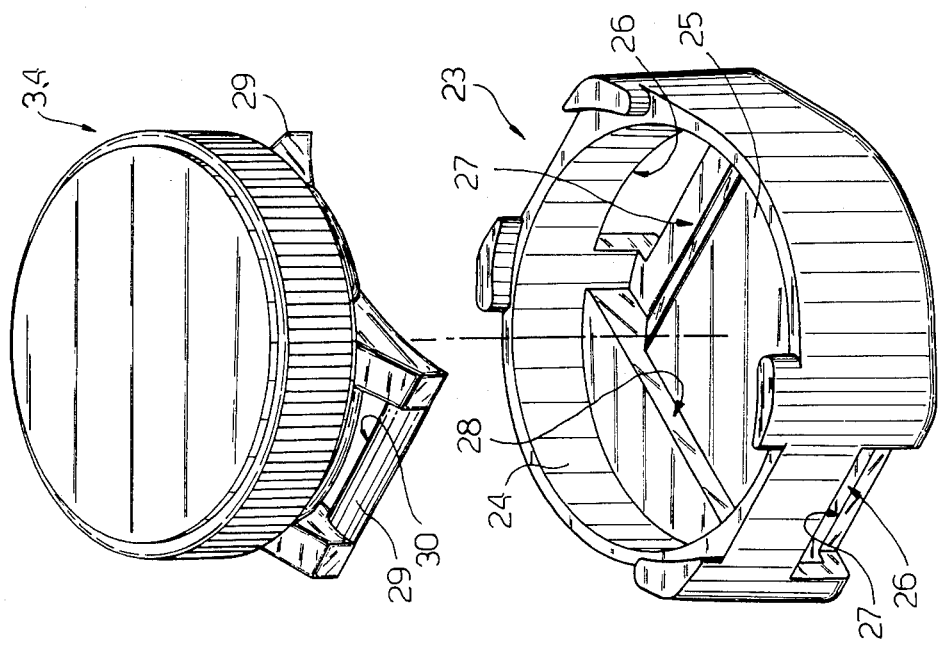
FIG. 6 is an exploded perspective view of a second instrument for consoles of FIGS. 1 and 4.

In FIGS. 1 to 3 there is illustrated a combined instrument system 1 for divers, hereinafter indicated with the term "console", and including a first instrument 2 constituted by a manometer and two further instruments 3 and 4, constituted, for example, by a depth meter coupled to a chronometer or else to a compass or to a decompression meter.

As illustrated in FIG. 1 and FIG. 3, the instrument 2 is clad externally by a substantially cup shape rubber body 5 and provided with a lateral radial projection 6 through which extends a length of tubing 7 constituted by a flexible duct for connecting the instrument 1 to the air bottles (not illustrated) of a self contained breathing apparatus (not illustrated).

Figure 5:
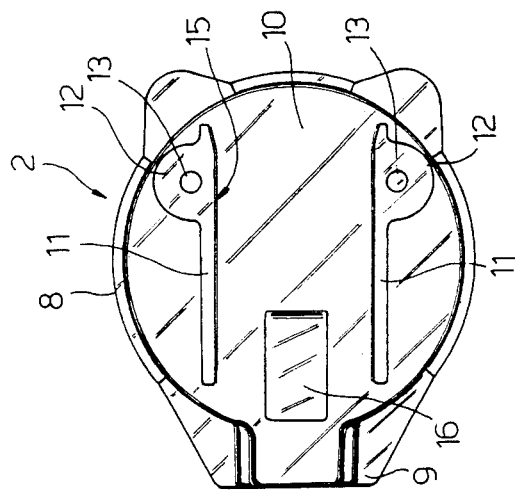
FIG. 5 is a rear view of a first instrument of the consoles of FIGS. 1 and 4.

One end of the tubing 7 penetrates into the interior of a substantially cylindrical cavity defined by the casing 5, and is connected through a coupling (not illustrated) to the instrument 2. As illustrated in FIGS. 3 and 5, the instrument 2 includes a cup shaped casing 8 having a lateral tubular projection 9 which can be connected in a fluid tight manner to the tubing 7 and is provided with a bottom wall 10 having two external ribs 11 which are parallel with one another and spaced from one another by a distance at least equal to the width of a usual strap normally used for the connection of normal wrist-mounted underwater instruments. The ribs 11 are disposed symmetrically with respect to a diametral axis of the wall 10 passing through the tubular projection 9 and parallel thereto, and each has at its end opposite the projection 9 an enlarged zone 12. From each zone 12 there extends, axially outwardly, a pin 13 which connects to the casing 8 a respective end of a bridge element 14 extending beneath the ribs 11 and transversely thereof to define, with these latter and the wall 10, a tubular seat 15 the thickness of which is at least equal to that of the said wrist strap (not illustrated). Between the ribs 11, close to the tubular projection 9, there is disposed an upstanding projection 16 having in plane a substantially rectangular form and in section a saw tooth shape laterally limited on the side facing the bridge element 14, by an inclined guide surface 17. The projection 16 snap engages in an aperture 18 formed through a link 19 preferably constituted by an elongate strip of plastics material having a width and a thickness corresponding to that of the said strap for wrist mounted instruments.

As illustrated in particular in FIG. 1, the link 19 extends along the seat 15 between the wall 10 and a bottom wall 20 of the casing 5, which maintains the link 19 in contact with the casing 8. The link 19 penetrates into the casing through a lateral slit 21 and is disposed with its free end beneath the projection 9 in a position facing a second slit 22, through which it is possible to insert, into the seat 15, an instrument (not illustrated) by means of which it is possible to fold the link 19 to disengage it from the projection 16.

A portion of the link 19 projects out from the casing 5 and extends through the casings 23 of the instruments 3 and 4, which casings are identical to one another.

As illustrated in particular in FIG. 6, each casing 23 is of cup-shape form and includes in side wall 24 of substantially cylindrical form closed at the lower end by a bottom wall 25 and provided with two diametrically opposite lateral apertures 26. The apertures 26 are formed substantially at the level of the inner surface of the wall 25 corresponding to the opposite lowered end 27 of a diametral groove 28 formed therein.

The said lowered ends 27 each receive a lateral rear projection 29 of the associated instrument 3, 4 in such a way that each aperture 26 is aligned with a respective slit 30 formed through the associated projection 29 in such a way that, by means of the introduction of the link 19 into the seat 31 defined by the groove 28, the aperture 26 and the slot 30, and having a thickness and width substantially equal to that of the seat 15, it is possible to connect the instruments 3 and 4 simultaneously to the associated casings 23 and instrument 2.

The casings 23 are preferably made of rubber and are designed in such a way that they can receive, without dimensional modifications, a wide range of instruments originally designed to be wrist mounted.

FIG. 4 relates to a console 32 including a wrist mounted instrument 33 the dimensions of which are such as not to permit the assembly thereof into a casing 23. In this case the link 19 is mounted directly through the slits 30 of the projections 29 of the instrument 33.

Locking of all instruments in contact with the instrument 2 is obtained by means of a block 34 connected to the link 19 by screws 35.

The part of the link 19 extending beyond the block 34 can be left free or cut off.

From the preceding description it is possible to observe how the utilisation of the link 19 permits the console to be made up from any number of instruments of any type whatsoever, which are normal wrist-mounted instruments. In this way the user will have the opportunity of making up a console by starting with the instrument 2, probably using, at least in part, the instruments already in his possessions and will be able to modify at will a console already formed, simply by replacing the link 19 with a new link 19 of different length.

I claim:

1. A combined instrument system for divers, comprising an elongate support connectable at one end to a user by a flexible attachment means, and a first and at least one second instrument connected to the said support, characterised by the fact that the said support includes a link engaged slidably through a respective seat formed on each said instrument; the said instruments being mounted in a line along the said link; the first of the said seats having a connection means to the said link to lock this latter in a movable manner into the said first seat; and locking means being provided for rigidly connecting each said second instrument to the said link.

2. An instrument system according to claim 1, characterised by the fact that the said connection means include coupling means snap engaged in a recess in the said link.

3. An instrument system according to claim 1, characterised by the fact that the said first instrument is a manometer; the said flexible attachment means include a flexible tube connecting the said manometer to a self contained breathing apparatus, and the said first seat is formed on an outer surface of the casing of the said manometer.

4. An instrument system according to claim 1, characterised by the fact that the said locking means include a block connected to the end of the said link opposite that connected to the said flexible attachment means for locking each said second instrument against the said first instrument.

5. An instrument system according to claim 1, characterised by the fact that the said link has a rectangular flat strip form, the thickness of which is similar to that of a normal connection strap for wrist mounted underwater instruments.

6. An instrument system according to claim 5, characterised by the fact that each said second instrument includes a normal wrist mounted instrument provided at the rear with attachment slits for the said strap; the said seat of each said second instrument being defined, at least in part, by the said slits.

7. An instrument system according to claim 6, characterised by the fact that at least one of the said second instruments is lodged within an auxilliary cup-shaped casing provided at the rear with an aperture through which the said link passes; this latter connecting together the said second instrument and the associated auxilliary casings.

8. An instrument system according to claim 7, characterised by the fact that the said auxilliary casing has an internal cavity which can selectively receive a plurality of different instruments.

* * * * *